United States Patent
Prater

[15] 3,684,048
[45] Aug. 15, 1972

[54] CAMPER

[72] Inventor: Charles Prater, Route 2, Box 888, Morehead, Ky. 40351

[22] Filed: Aug. 24, 1970

[21] Appl. No.: 66,316

Related U.S. Application Data

[63] Continuation-in-part of Ser. No. 739,779, June 25, 1965, abandoned.

[52] U.S. Cl. ................180/89, 280/34 R, 296/23 MC
[51] Int. Cl. ..............................................B62d 21/14
[58] Field of Search ..............296/23, 23 MC; 280/34

[56] References Cited

UNITED STATES PATENTS 3,542,414  11/1970  Nelson.................296/23 MC
3,248,083  1/1965  De Gennaro.........296/23 MC

*Primary Examiner*—Philip Goodman
*Attorney*—Alfred E. Wilson

[57] ABSTRACT

A load carrying vehicle such as a camper adapted to be detachably connected to a tractor vehicle of the pick-up truck body type, preferably of the four wheel drive type having a cargo compartment body box positioned behind the passenger compartment, and a draw-bar or rear plate carried by the chassis of the truck at the rear of and beneath the body box or cargo compartment. The camper or other load carrying vehicle has a centrally disposed bottom section adapted to be positioned within the body box or cargo compartment of the pick-up truck vehicle, and to be secured to the draw-bar or rear plate positioned at the rear of the truck. The camper has aligned laterally enlarged or wider sections, (1) to overlie the sidewalls of the members defining the bed or cargo compartments of the pick-up truck, and (2) to overlie the passenger compartment of the tractor vehicle, and (3) positioned at the rear of or behind the tractor vehicle. The camper or load carrying vehicle has a pair of independent wheels beneath the wider section positioned at the rear of or behind the tractor vehicle to support a portion of its load of the camper. These independent wheels are preferably at a wider tread width than the wheels of the tractor vehicle to stabilize the camper vehicle and to prevent excessive roll of the assembly consisting of the tractor vehicle and the camper as it rounds curves or transverses rough terrain.

8 Claims, 3 Drawing Figures

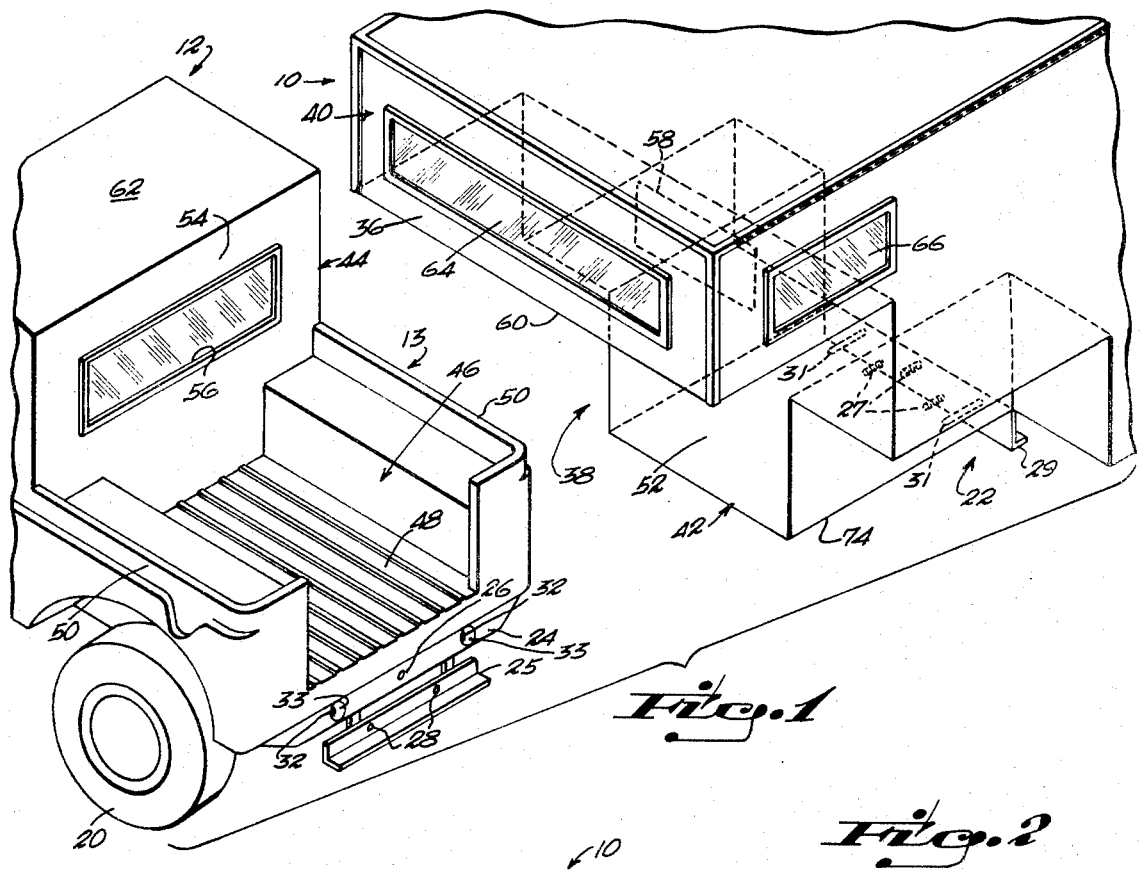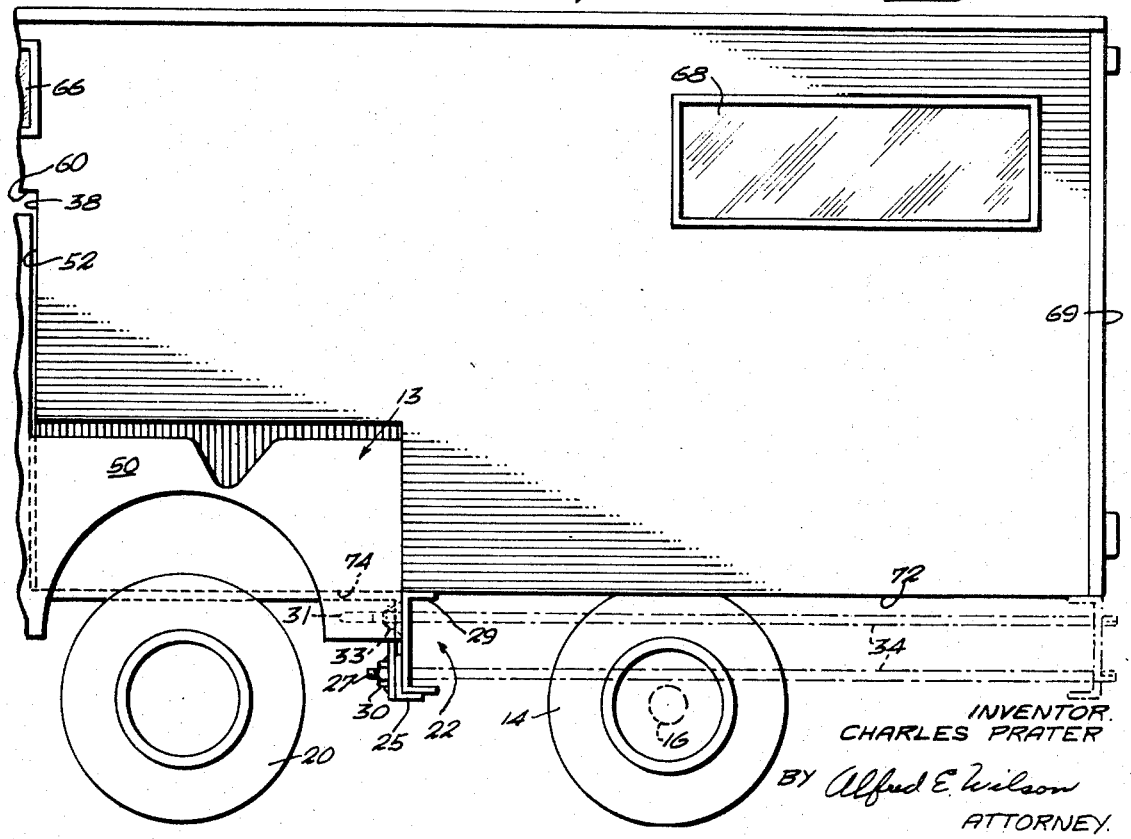

CAMPER

This is a continuation in part of my co-pending patent application entitled "Camper", Ser. No. 739,779, filed June 25, 1968 now abandoned and relates to load carrying vehicles, and has particular application to a mobile camper adapted to overlie and to be detachably connected to a tractor vehicle of the utility or truck body type, preferably of the four whell drive type, the load carrying vehicle or camper having a pair of wheels spaced laterally outside of the wheels of the vehicle to provide a stable assembly.

It has been common practice to secure load carrying vehicles of the camper type having all of the necessary living facilities, to the body of small trucks. In order to maintain a proper weight distribution on the truck and to provide the necessary living quarters, the campers of necessity are short and are positioned relatively high. A top-heavy unit having cramped space results.

My improved load carrying vehicle has a pair of load supporting wheels adapted to be positioned behind, and preferably laterally outside of the wheels of the tractor vehicle to which it is secured. It is thus possible to provide a longer and lower partially self supported vehicle. When applied to campers a larger unit is possible having greater interior space, and a unit which is lower and longer and thus insures greater stability when applied to the tractor vehicle. While my improved camper is especially designed for use with the small vehicles such as the "Jeep" type four wheel drive vehicle it can be advantageously used with all vehicles of the pick-up truck body type. The wheels of the camper are preferably positioned laterally outside of the tread width of the vehicle to which it is secured. A very stable assembly is thus provided.

An object of my invention is therefore to provide an improved load carrying vehicle of the camper type adapted to overlie a "Jeep" or "Pick-up" type vehicle and having a pair of wheels positioned rearwardly of the rear wheels of the tractor vehicle to support a portion of the weight of the camper thereby permitting an increase of the overall length and living space within the camper.

A further object of my invention resides in the provision of a camper adapted to be secured at an intermediate portion thereof to the rear of a "Jeep" or "Pick-up" type tractor vehicle, and wherein clamping means are provided for securing the intermediate portion of the camper to the rear end of the tractor vehicle.

Another object of my invention is to provide a camper having a pair of load carrying wheels to trail behind the rear wheels of the tractor vehicle to which the camper is secured, the wheels of the camper being spaced further apart than the wheels of the tractor vehicle to permit the design of a camper having increased width within the camper for living space, and to provide a more stable overall vehicle assembly having better driving characteristics.

Other objects and advantages of my improved load carrying vehicle will be pointed out in the following detailed description considered with the accompanying drawings.

In the drawings wherein similar parts have been identified by similar numerals throughout the various views:

FIG. 1 is a perspective view illustrating my improved load carrying vehicle of the camper type disassembled with respect to a "Jeep" or "Pick-up" type tractor vehicle;

FIG. 2 is a fragmentary side elevational view showing the camper type load carrying vehicle and the tractor vehicle in assembled relation;

Figure 3:
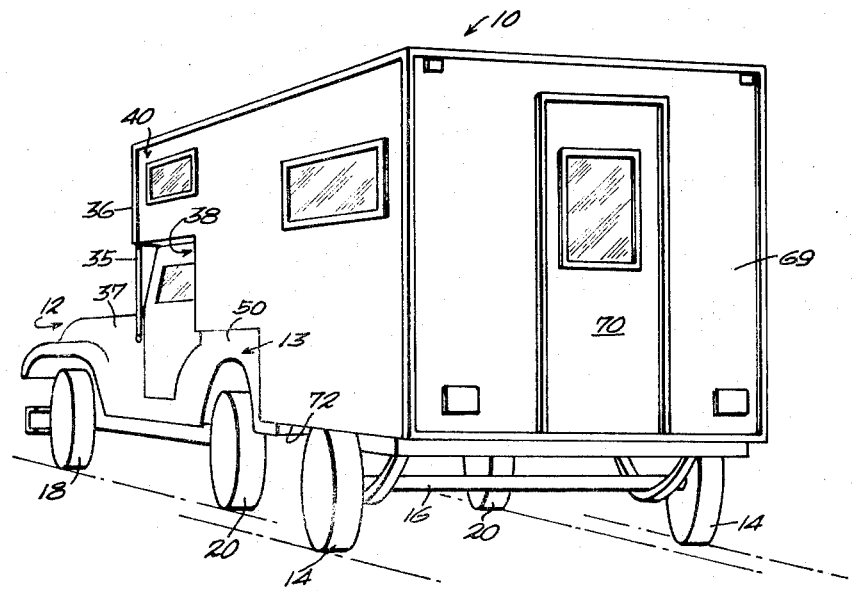
FIG. 3 is a perspective view of one side and the rear of the assembly of FIG. 2 illustrating the tread width of the camper relative to the tread width of the tractor vehicle.

Referring now more particularly to the drawings a load carrying vehicle 10 of the camper type is adapted to be secured to a motorized tractor vehicle 12 of the "Jeep" or "Pick-up" body type having for example a small cargo carrying compartment 13.

The load carrying vehicle or camper 10 has a pair of wheels 14 suitably mounted as illustrated at 16 on an axle secured to the frame of the vehicle. If desired the wheels 14 may be individually mounted to eliminate the axle 16. The wheels 14 are preferably set at a wider tread width laterally than are the front and rear wheels 18 and 20 of the vehicle 12 to increase the stability of the assembly.

The camper 10 has a longitudinally intermediate drawbar portion 22 adapted to lie adjacent to and to be secured to a drawbar assembly comprised for example of upper and lower rear plates 24 and 25 of the tractor vehicle 12 or to any portion thereof capable of transmitting motive force from the vehicle to the camper. The draw bar assembly or plates 24 and 25 preferably have upper and lower threaded apertures 26 and 28 for the reception of bolts 27 passing through a frame member 29 of the camper 10 at the intermediate portion 22 thereof. The apertures 26 and 28 instead of being threaded may, as illustrated in FIG. 2 have nuts 30 welded to the draw bar assembly for the reception of the bolts 27. A pair of apered guide pins 31 fixed to the frame member 29 of the camper or vehicle 10 are adapted to be received within spaced apart apertures 32, preferably in upper plate 24 in vertical alignment with the aperture 26. The apertures 32 are preferably provided with rearwardly flared guides 33 to cooperate in aligning the securing bolts 27 with the apertures 26 and 28 when the tractor vehicle is moved rearwardly to effect a coupling engagement with the camper. If desired the ends of the tapered pins may also be screw threaded to receive nuts in the same manner as studs 27 to provide additional securing means for the camper to the tractor vehicle.

If desired, motion transmitting means, such for example, long rods 34 extending longitudinally of the underside of the camper 10 which may be integral with or secured to the bolts 27 to permit tightening the bolts 27 with respect to the threaded fasteners 30 from the rear of the camper 10 as illustrated in FIG. 2. Suitable two directional brace or fastening members 35, preferably of rod type, are provided to secure the front end 36 of the camper 10 to the forward end 37 of the tractor vehicle 12 as seen in FIG. 3.

The camper 10 has a stepped or cut-out portion 38 to provide a relatively, vertically shallow frontend portion 40 over-lying the top of the passenger compartment 44 of the tractor vehicle 12. The camper 12 also has a reduced width front bottom portion 42, immediately rearwardly of the lower portion of the stepped or cutout portion 38, which is dimensional and proportioned to be received within the body box 46 of the tractor vehicle as defined by the floor 48 and the parallel side walls 50—50 thereof.

The generally T shaped front wall 52 of the camper thus formed lies immediately adjacent the rear closure 54 of the passenger compartment 44 of the tractor vehicle 12 when the camper is attached to the tractor vehicle in the manner above described. Suitable aligned openings 56 and 58 in the rear closure 54 and the T shaped front wall 52 respectively, may be provided to permit access between the passenger compartment 44 of the tractor vehicle 12 and the space within the camper 10. The openings 56 and 58 are both preferably provided with suitable, openable closure means such as hinged flaps or windows.

The portion 40 overlying the top of the passenger compartment 44 has a horizontal wall or floor 60 to overlie the top 62 of the tractor vehicle passenger compartment 44. Suitable front and side windows 64, 66 and 68 are provided for the comfort and convenience of the occupants of the camper 10. The rear wall 69 of the cam per 10 is provided with a door 70 for access to the interior of the camper 10 and a floor 72 extends from the rear wall forwardly to the T shaped front wall 52 and includes a reduced width portion 74 which overlies the floor 48 of the body box 46 of the tractor vehicle 12 when the camper is attached to the tractor vehicle in the manner previously described.

My improved camper may be fitted out interiorly with all of the usual living accomodations such as stove, refrigerator, beds, sink, chairs and other necessary accomodations, articles of furniture etc as desired. In view of the fact that my camper has a substantial portion of its weight supported on its own wheels, the camper may be much longer than those campers which are secured on top of a small truck of the "Pick-up" type. Also in view of the fact that the wheels 14 are set further apart than the normal tread width of the vehicle 12 to which the camper is secured, the floor 72 adjacent the rear of the camper 10 can be positioned lower with respect to the vehicle 12 than is possible with units mounted on top of the vehicle 12. A camper having far greater head-room and more living space within the camper results.

Since the wheels 14 of the camper 10 are positioned laterally outside of the wheels 18 and 20 of the vehicle 12 a more suitably stable and a safer vehicle assembly results, and one which provides greater living space within the camper for the occupants thereof.

My novel assembly of load carrying and tractor vehicles has improved driving characteristics. For example when going up a steep hill, a larger portion of the weight of a conventional camper vehicle is shifted to the rear wheels. The loading on the front or steerable wheels is proportionately reduced whereupon the steerability of the vehicle is reduced or become sluggish.

With my improved vehicle consisting of the load carrying and the tractor elements, the auxiliary rear wheels carried by the load carrying vehicle function as a fulcrum and induce a greater proportion of the weight of the combined load carrying and tractor elements of the vehicle to remain on the front or steerable wheels, whereupon the steerability of the vehicle is improved.

While my improved camper is not limited to use with four-wheel drive vehicles, there is an advantage in its use with four wheel drive vehicles. For example when travelling in rough terrain, as when crossing a ditch or swail it is possible with a two-wheel drive vehicle for the driving wheels to be elevated above the ditch to such a point that driving traction is lost. The only way to extricate the vehicle from that situation is to get it moved forward or backward to such an extent that the driving wheels regain driving traction. With the four wheel drive vehicle this situation would not occur since at least one pair of driving wheels will at all times maintain driving contact with the ground.

While my invention has been described with particular reference to the camper type or load carrying vehicle, it will be apparent that it is applicable to all types of load carrying vehicles such for example as horse and other animal carrying vehicles and specialized cargo carriers.

I claim:

1. In combination, a tractor vehicle of the pick-up truck body type and a load carrying camper, said tractor vehicle comprising;
   A. a chassis and body having,
      1. front and rear pairs of wheels of predetermined tread width, and
      2. a forwardly disposed engine compartment,
      3. an engine in said compartment,
      4. means to exert driving torque from the engine to one of said pairs of wheels,
      5. a passenger compartment positioned behind the engine,
      6. a cargo compartment body box behind the passenger compartment defined by
         a. a floor,
         b. laterally spaced vertically disposed longitudinally extending side walls, and
         c. a vertically disposed transversely extending wall behind and adjacent to the passenger compartment, said load carrying camper comprising;
      A. a front bottom section, having laterally spaced vertically disposed side walls, and a floor and a front wall, proportioned to be received within the cargo compartment body box over the floor of said body box and between the vertically disposed longitudinally extending side walls thereof,
      B. an upper laterally enlarged section above said front bottom section adapted to overlie and extend laterally beyond the sidewalls of said body box,
      C. a forward extending section of substantially the same width as said upper laterally enlarged section adapted to overlie the passenger compartment,
      D. a rearwardly extending section of substantially the same width as said upper laterally enlarged section extending rearwardly of both the front bottom section and the upper laterally enlarged section,
      E. a pair of independent wheels mounted on the load carrying camper beneath said rearwardly extending section, said independent wheels being mounted thereon at a greater tread width than the tread width of the wheels of the tractor vehicle, and F. means to detachably connect the load carrying camper to the tractor vehicle comprising fastening means longitudinally spaced relative to each other and cooperating to clamp the camper to the tractor vehicle whereby angular movement of the camper about a horizontal axis relative to the tractor vehicle is prevented.

2. The invention defined in claim 1 wherein the tractor vehicle is of the four-wheel-drive type having selectively operable means to intermittently exert driving torque to the other of said pairs of wheels to permit exerting continuous driving torque to the ground if one of said pairs of wheels should lose driving contact with the ground.

3. The invention defined in claim 1 wherein the tractor vehicle has drawbar means at the rear end thereof, and the camper has drawbar means at a longitudinally intermediate portion thereof, and threaded fastening means to secure said drawbar means together.

4. The invention defined in claim 3 wherein said vehicle drawbar means is at the rear of the chassis of the vehicle and at the bottom of the camper substantially at the juncture of said front bottom and rearwardly extending sections, and the said threaded fastening means secure said drawbar means together.

5. The invention defined in claim 4 wherein the fastening means are screw threaded fasteners.

6. The invention as defined in claim 5 wherein motion transmitting means operable from the rear end of the load carrying camper are provided to actuate said clamping means for detachably securing the camper to the drawbar means of the tractor vehicle.

7. The invention as defined in claim 6 wherein the clamping means are bolts carried by the load carrying camper and threaded fasteners fixed to the drawbar means.

8. The invention as defined in claim 7 wherein the bolts and threaded fasteners are arranged in two vertically spaced planes.

* * * * *